(12) United States Patent
Itoh et al.

(10) Patent No.: US 11,529,999 B2
(45) Date of Patent: Dec. 20, 2022

(54) VEHICLE

(71) Applicants: TOYOTA JIDOSHA KABUSHIKI KAISHA, Toyota (JP); SUBARU CORPORATION, Tokyo (JP)

(72) Inventors: Tadashi Itoh, Toyota (JP); Shinya Kamimura, Toyota (JP); Tatsunari Imazato, Shibuya-ku (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/396,074

(22) Filed: Aug. 6, 2021

(65) Prior Publication Data

US 2022/0073144 A1 Mar. 10, 2022

(30) Foreign Application Priority Data

Sep. 4, 2020 (JP) .............................. JP2020-149270

(51) Int. Cl.
*B62D 25/04* (2006.01)
*B62D 25/06* (2006.01)
*B62D 25/02* (2006.01)

(52) U.S. Cl.
CPC ............. *B62D 25/04* (2013.01); *B62D 25/02* (2013.01); *B62D 25/06* (2013.01)

(58) Field of Classification Search
CPC ........ B62D 25/02; B62D 25/04; B62D 25/08; B62D 27/023; B60J 5/107
USPC ............ 296/203.01, 203.03, 203.04, 193.06, 296/193.08, 198
See application file for complete search history.

(56) References Cited

FOREIGN PATENT DOCUMENTS

| CN | 103661616 B | * | 1/2019 | ............ B62D 25/04 |
|---|---|---|---|---|
| JP | 2553401 Y2 | * | 11/1997 | ............ B62D 25/04 |
| JP | 2015-136999 A | | 7/2015 | |
| JP | 2018-075894 A | | 5/2018 | |
| JP | 2019-196104 A | | 11/2019 | |

* cited by examiner

*Primary Examiner* — Dennis H Pedder
(74) *Attorney, Agent, or Firm* — Oliff PLC

(57) ABSTRACT

A vehicle may include: a roof; a back door; a pillar provided next to the back door, having a tubular shape, and extending slantingly downward and backward from the roof; a vertical member provided below the pillar, extending along a vertical direction, and connected to the pillar from below; and a reinforcing member provided inside the pillar at a connection between the pillar and the vertical member and joined to the pillar.

2 Claims, 7 Drawing Sheets

VEHICLE

CROSS-REFERENCE TO RELATED APPLICATION

This application claims priority to Japanese Patent Application No. 2020-149270 filed on Sep. 4, 2020, the contents of which are hereby incorporated by reference into the present application.

TECHNICAL FIELD

The technique disclosed herein relates to a vehicle.

BACKGROUND

Japanese Patent Application Publication No. 2019-196104 describes a rear structure of a vehicle. This vehicle includes pillars on sides of a back door.

SUMMARY

Due to vibration from a road, pillar(s) provided next to a back door may vibrate at a great extent. The present disclosure provides a technique to reduce vibration of pillar(s) provided next to a back door.

A vehicle disclosed herein may comprise a roof; a back door; a pillar provided next to the back door, having a tubular shape, and extending slantingly downward and backward from the roof; a vertical member provided below the pillar, extending along a vertical direction, and connected to the pillar from below; and a reinforcing member provided inside the pillar at a connection between the pillar and the vertical member and joined to the pillar.

In this vehicle, the pillar is connected to the vertical member. The vertical member reduces vibration of an entirety of the pillar. In addition, in this vehicle, the pillar has the tubular shape, and the vertical member is connected to the pillar from below. Force thereby acts on an outer wall of the pillar in a vicinity of a position where the vertical member is connected to the pillar (that is, a position where the pillar is held by the vertical member) such that a cross-section of the pillar distorts, as a result of which vibration is generated in the outer wall. However, since the reinforcing member is provided inside the pillar at the connection between the pillar and the vertical member, rigidity of the pillar is increased. Thereby, distortion of the cross-section of the pillar can be mitigated, and the vibration of the outer wall of the pillar can be reduced. Therefore, according to this configuration, the vibration of the pillar can effectively be reduced.

DETAILED DESCRIPTION

Some of the technical elements disclosed herein will be listed below. It should be noted that the respective technical elements are independent of one another, and are useful solely or in combinations.

In an example of the vehicle disclosed herein, an inner surface of the pillar may include a ceiling surface and a floor surface, and the reinforcing member may comprise: a top plate extending along the ceiling surface; a side plate extending downward from at least one of a front end and a rear end of the top plate; and a flange extending from the side plate along the floor surface. The top plate may be joined to the ceiling surface. The flange may be joined to the floor surface.

By joining the reinforcing member to the ceiling surface and the floor surface as such, rigidity of the pillar can more effectively be increased.

In an example of the vehicle disclosed herein, the vertical member may comprise a plate portion extending along a width direction of the vehicle and along the vertical direction and including an upper end connected to the pillar. The side plate may be provided in an extension region extended from the plate portion.

According to this configuration, distortion of a cross-section of the pillar can more effectively be mitigated.

In an example of the vehicle disclosed herein, the reinforcing member may comprise an end that is not joined to the pillar, the end being on an outer side of the reinforcing member in the width direction of the vehicle. The top plate and the side plate may be stepped at the end of the reinforcing member.

By the end being the stepped as above, rigidity of the reinforcing member can be increased at the end when the reinforcing member includes the end that cannot be connected to the pillar. By increasing the rigidity of the end of the reinforcing member, distortion of the pillar in the vicinity of the end can be mitigated. Therefore, according to this configuration, vibration of the pillar can more effectively be reduced.

In an example of the vehicle disclosed herein, the reinforcing member may comprise a first plate portion extending upward from the top plate. The pillar may comprise an upper plate constituting the ceiling surface and a lower plate constituting the floor surface. The upper plate may comprise a second plate portion extending along the first plate portion. The lower plate may comprise a third plate portion extending along the first plate portion. The first plate portion, the second plate portion, and the third plate portion may be joined to each other.

According to this configuration, the reinforcing member and the pillar can more firmly joined to each other, by which the rigidity of the pillar can further be increased.

Figure 1:
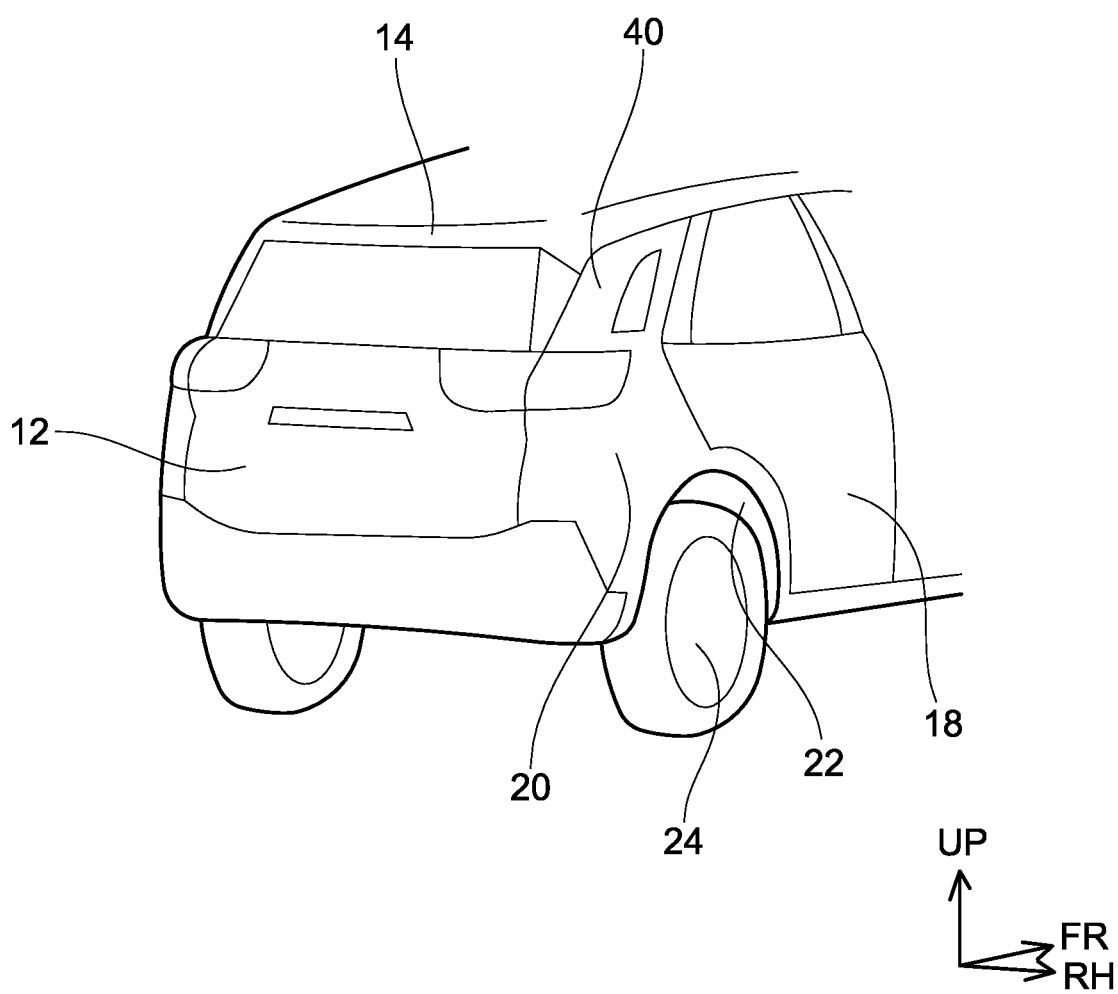
FIG. 1 illustrates a perspective view of a rear end of a vehicle 10.

FIG. 1 illustrates a vehicle 10 of an embodiment. In the drawings including FIG. 1, an arrow UP indicates an upward direction of the vehicle, an arrow FR indicates a forward direction of the vehicle, and an arrow RH indicates a rightward direction of the vehicle. The vehicle 10 includes a roof 14, a back door 12, rear pillars 40, and rear doors 18. The back door 12 is disposed below a rear end of the roof 14. The back door 12 opens and closes an opening in the rear end of the vehicle. The rear pillars 40 are each disposed next to the back door 12. The rear pillars 40 are disposed between the back door 12 and the respective rear doors 18. A surface of each rear pillar 40 is covered by a quarter panel 20. In addition, a wheel housing panel 22 for housing a rear wheel 24 is disposed below each quarter panel 20. The wheel housing panel 22 is joined to each quarter panel 20. The vehicle 10 includes the pair of right and left rear pillars. Since the right and left rear pillars have the same structure, the rear pillar 40 on the right side will be explained.

Figure 2:
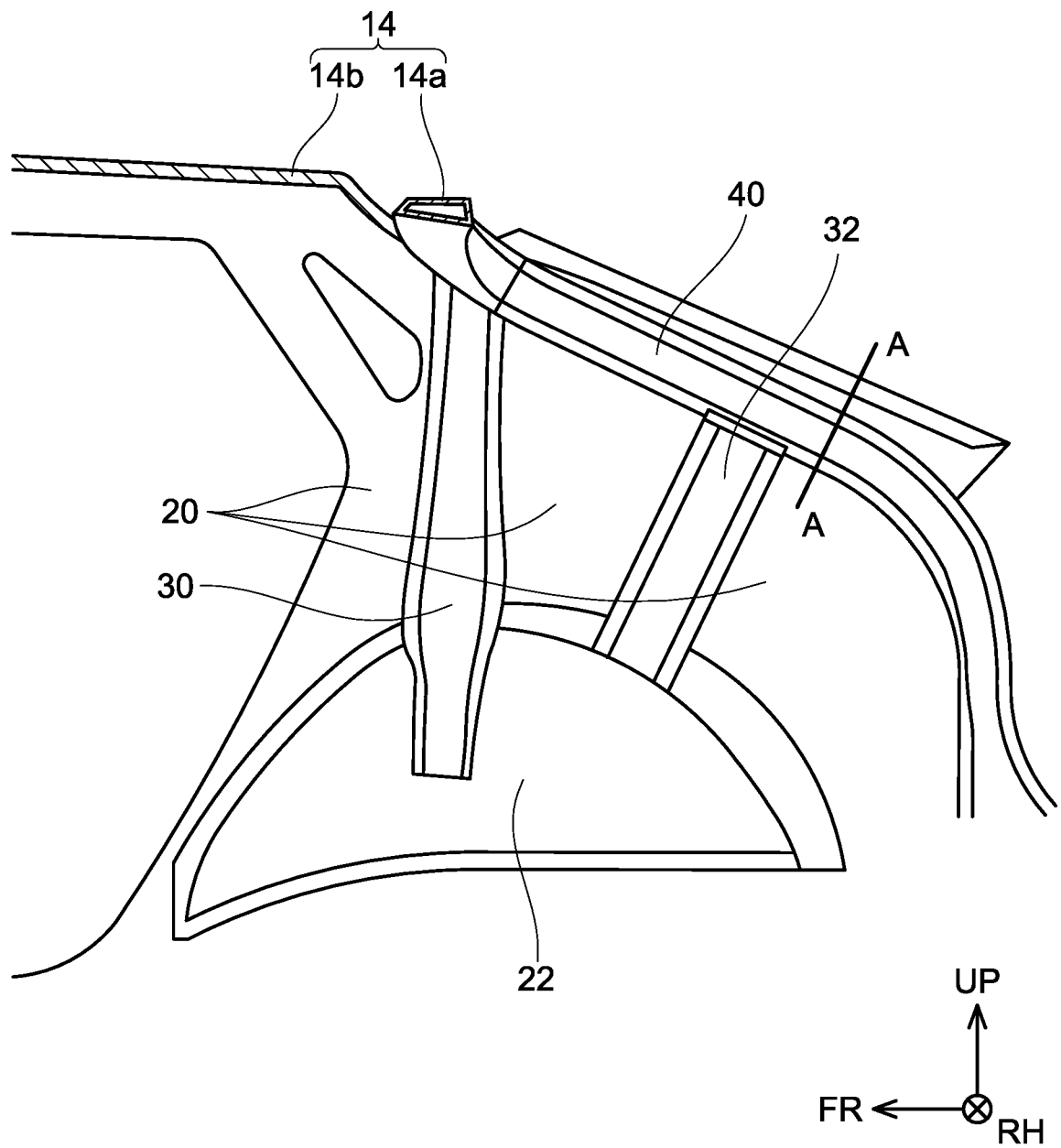
FIG. 2 illustrates a plan view of a rear pillar 40 and its surroundings viewed from inside the vehicle.

FIG. 2 illustrates a view of the rear pillar 40 viewed from inside a cabin with the back door 12 opened. The rear pillar 40 is a frame member constituting a body of the vehicle 10. The vehicle 10 includes a roof crossmember 14*a*, a vertical member 30, and a vertical member 32 as frame members constituting its body.

The roof crossmember 14*a* constitutes the roof 14 along with a roof panel 14*b*. The roof crossmember 14*a* is disposed at the rear end of the roof 14, and extends long in a width direction of the vehicle 10. The roof panel 14*b* covers a top portion of the vehicle 10. An upper end of the rear pillar 40 is connected to the roof crossmember 14*a*. Although not illustrated, an upper end of the rear pillar on the left side is also connected to the roof crossmember 14*a*. In other words, the roof crossmember 14*a* connects respective upper ends of the rear pillars on the right and left sides. The rear pillar 40 extends slantingly downward and backward from the roof crossmember 14*a*. Although not illustrated, a lower end of the rear pillar 40 is connected to a frame member (such as a rear side member) constituting a lower end of the vehicle 10.

The vertical members 30, 32 are provided inward of the quarter panel 20. The vertical member 30 extends substantially directly upward from the wheel housing panel 22. An upper end of the vertical member 30 is connected to the roof crossmember 14*a*. The vertical member 30 is fixed to the wheel housing panel 22, the quarter panel 20, and the roof crossmember 14*a* by for example welding. The vertical member 32 is provided rearward of the vertical member 30. The vertical member 32 is disposed below the rear pillar 40. The vertical member 32 extends slantingly upward and backward from the wheel housing panel 22. In other words, the vertical member 32 extends along a vertical direction. An upper end of the vertical member 32 is connected to the rear pillar 40. The vertical member 32 is fixed to the wheel housing panel 22, the quarter panel 20, and the rear pillar 40 by for example welding.

Figure 3:
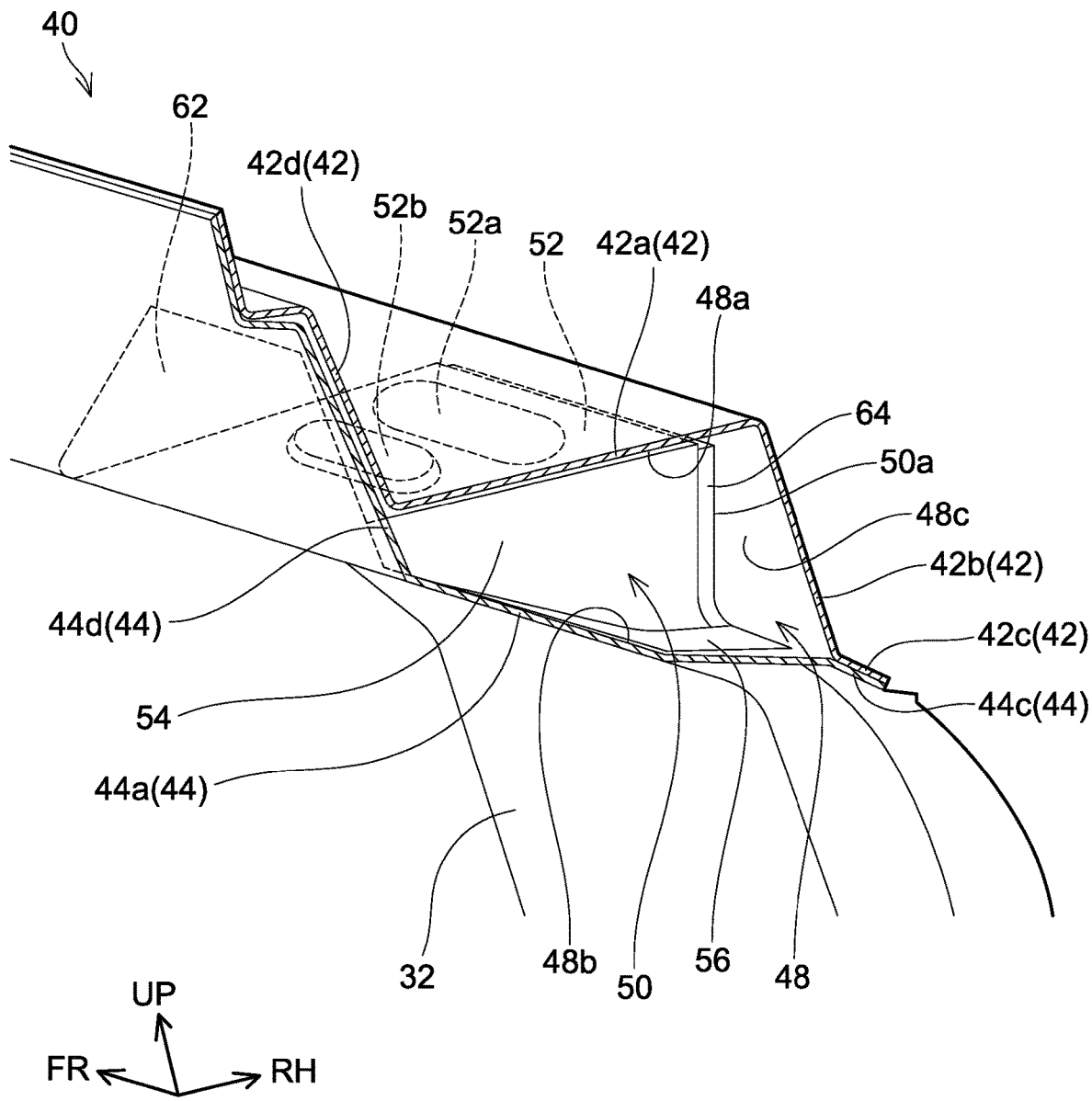
FIG. 3 illustrates a cross-sectional view along an A-A line of FIG. 2.
Figure 4:
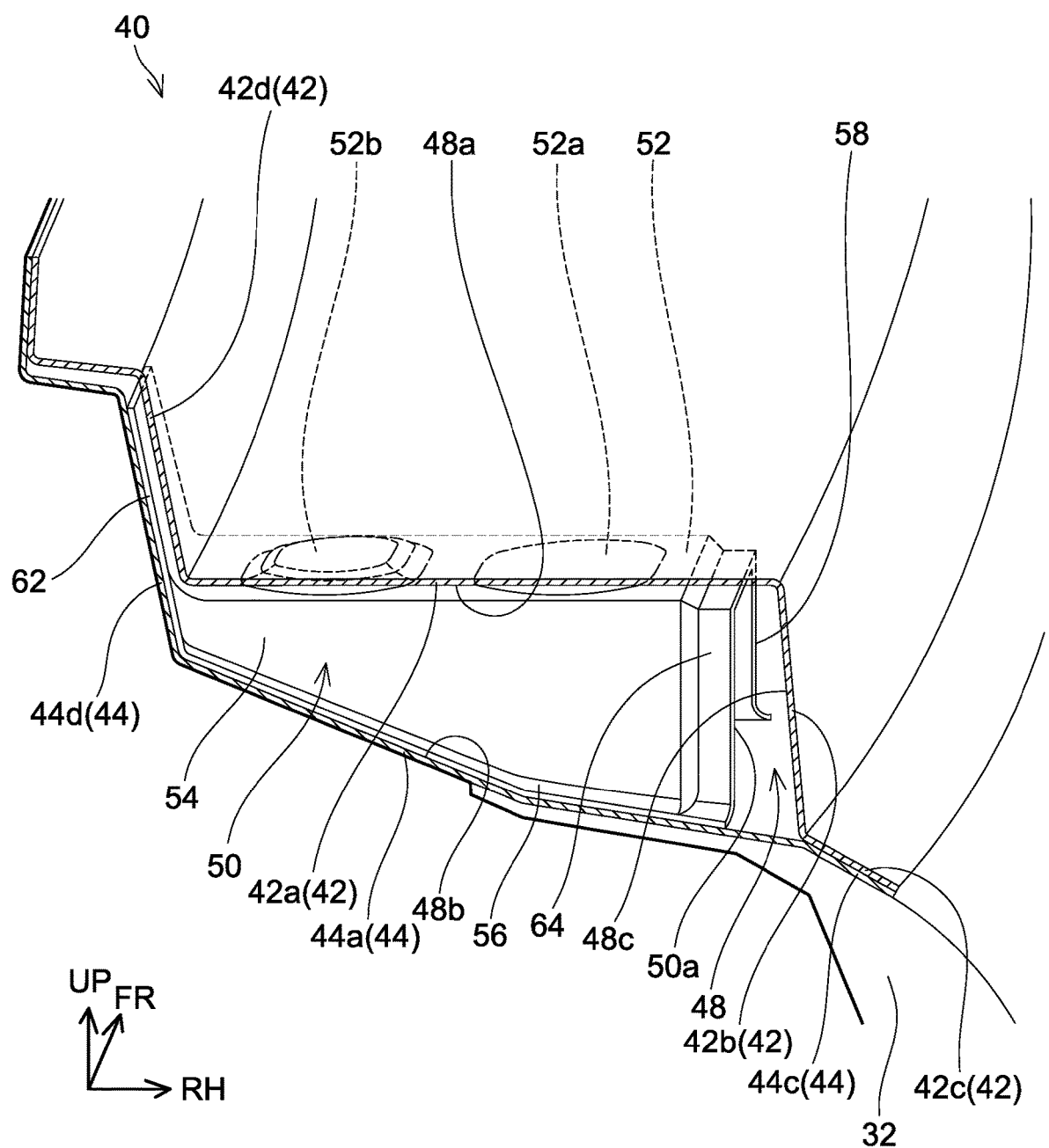
FIG. 4 illustrates a cross-sectional view along the A-A line of FIG. 2.

FIGS. 3 and 4 illustrate a cross-section of the rear pillar 40 along an A-A line of FIG. 2. The rear pillar 40 is constituted of two plate members 42, 44 (for example, metal sheets). The plate member 42 is disposed on the plate member 44. The plate member 42 includes a ceiling portion 42*a*, a side surface portion 42*b*, an edge portion 42*c*, and an extending portion 42*d*. The ceiling portion 42*a* extends substantially horizontally in its cross-section along the width direction. The side surface portion 42*b* extends downward from an end of the ceiling portion 42*a* on an outer side in the width direction. The edge portion 42*c* extends outward in the width direction from a lower end of the side surface portion 42*b*. The extending portion 42*d* extends, in a plate shape, upward from an end of the ceiling portion 42*a* on an inner side in the width direction. The plate member 44 includes a bottom portion 44*a*, an edge portion 44*c*, and an extending portion 44*d*. The bottom portion 44*a* extends to displace downward toward the outside of the vehicle in a cross-section along the width direction. The edge portion 44*c* extends outwards in the width direction from an end of the bottom portion 44*a* on an outer side in the width direction. The extending portion 44*d* extends, in a plate shape, upward from an end of the bottom portion 44*a* on an inner side in the width direction. The plate member 42 overlaps the plate member 44 such that the ceiling portion 42*a* opposes the bottom portion 44*a*, the edge portion 42*c* overlaps the edge portion 44*c*, and the extending portion 42*d* overlaps the extending portion 44*d*. The edge portion 42*c* is joined to the edge portion 44*c* by for example welding, and the extending portion 42*d* is joined to the extending portion 44*d* by for example welding. A space 48 surrounded by the ceiling portion 42*a*, the side surface portion 42*b* and the bottom portion 44*a* is defined inside the rear pillar 40. The rear pillar 40 has a tubular shape, which is defined by extending its cross-sectional shape as illustrated in FIGS. 3 and 4 (cross-sectional shape having the space 48 therein) in its longitudinal direction. A ceiling surface 48*a* of the space 48 is a bottom surface of the ceiling portion 42*a*, a floor surface 48*b* of the space 48 is a top surface of the bottom portion 44*a*, and the side surface 48*c* of the space 48 is an inner surface of the side surface portion 42*b*.

Figure 5:
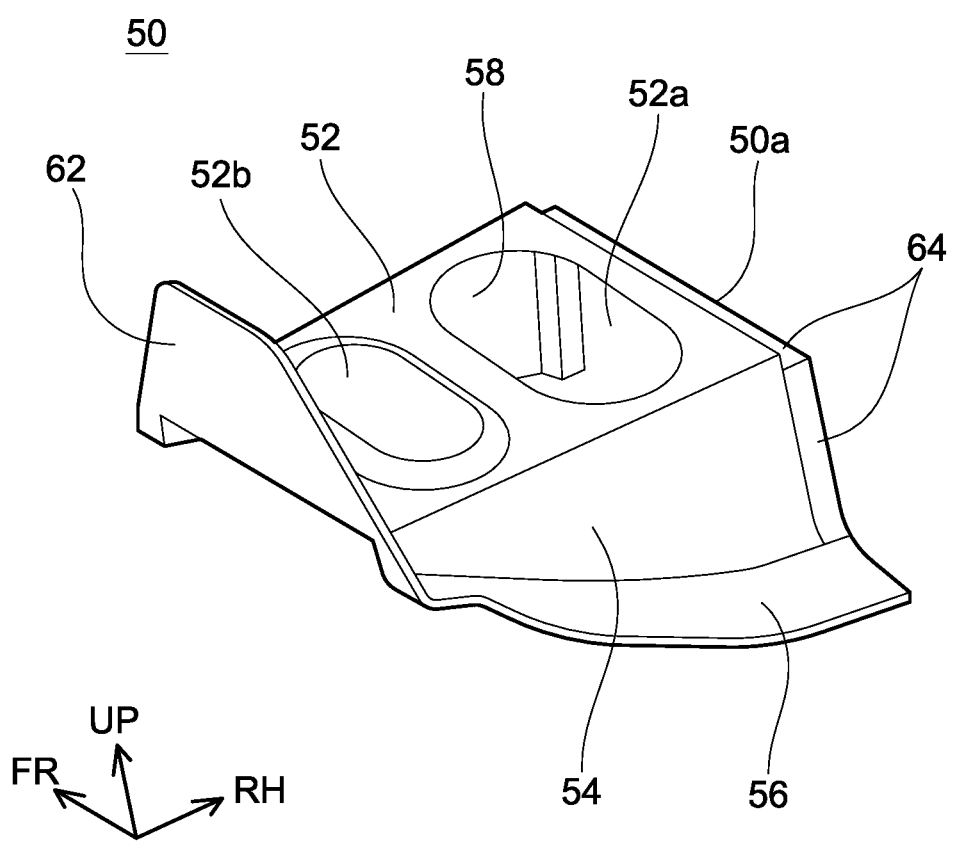
FIG. 5 illustrates a perspective view of a reinforcing member 50.

As illustrated in FIGS. 3 and 4, a reinforcing member 50 is provided in the space 48 inside the rear pillar 40. The reinforcing member 50 is provided at a connection between the vertical member 32 and the rear pillar 40. In other words, the reinforcing member 50 is provided at a top portion of the vertical member 32. As illustrated in FIG. 5, the reinforcing member 50 includes a top plate 52. As illustrated in FIGS. 3 and 4, the top plate 52 extends along the ceiling surface 48*a*. A through hole 52*a* is defined in the top plate 52 and a projection 52*b* is provided on the top plate 52. The projection 52*b* projects upward to a position higher than its surroundings. The top plate 52 is joined at its projection 52*b* to the ceiling surface 48*a* (that is, the ceiling portion 42*a* of the plate member 42) by for example welding.

As illustrated in FIG. 5, the reinforcing member 50 includes a side plate 54 and a flange 56. The side plate 54 extends downward from a rear end of the top plate 52. The side plate 54 extends along the width direction and the vertical direction. The flange 56 extends rearward form a lower end of the side plate 54. As illustrated in FIGS. 3 and 4, the flange 56 is in contact with the floor surface 48*h*. The flange 56 is joined to the floor surface 48*b* (that is, the bottom portion 44*a* of the plate member 44) by for example welding.

Figure 6:
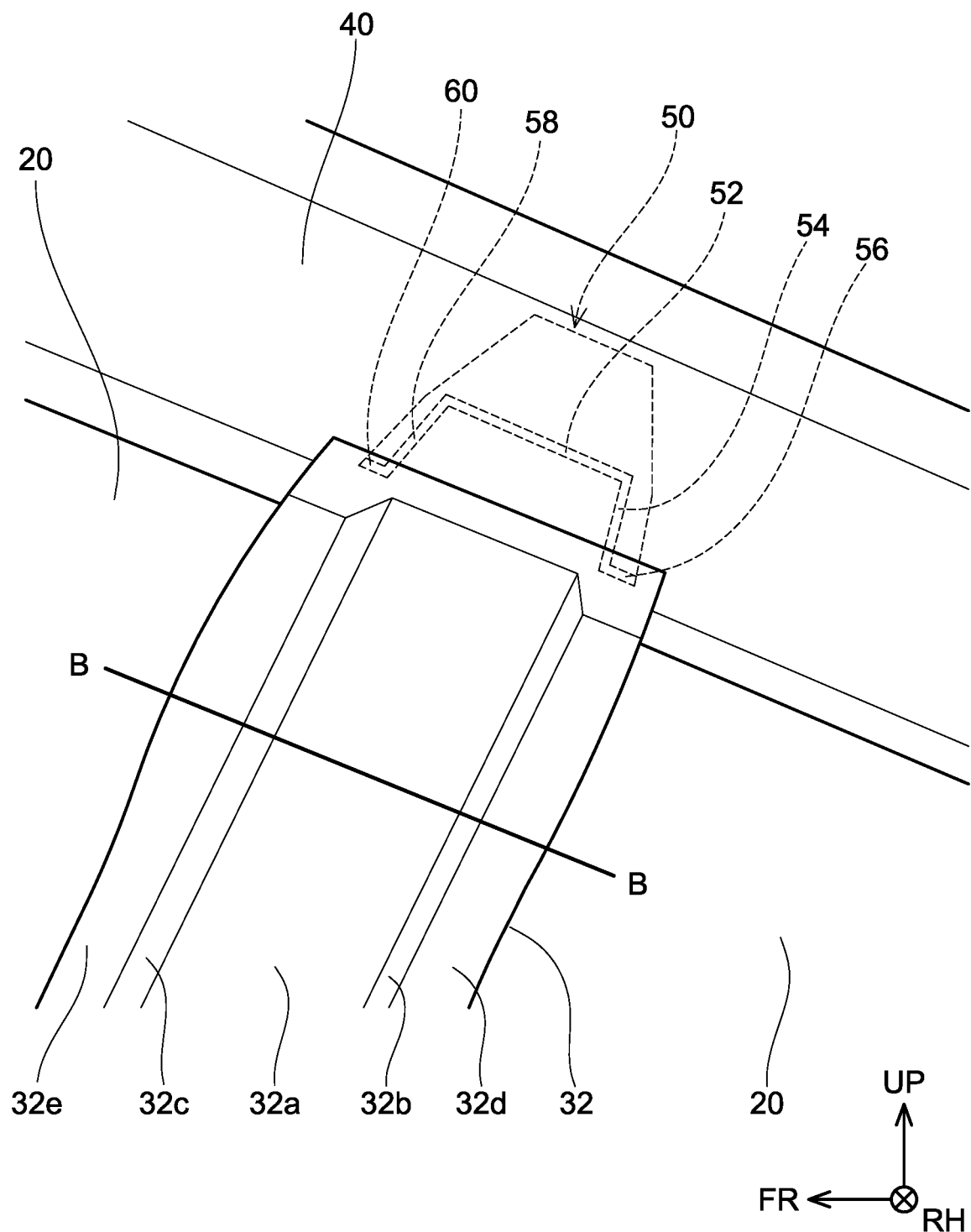
FIG. 6 illustrates an enlarged plan view of a connection between a vertical member 32 and the rear pillar 40.

As illustrated in FIG. 6, the reinforcing member 50 includes a side plate 58 and a flange 60. The side plate 58 extends downward from a front end of the top plate 52. The side plate 58 extends along the width direction and the vertical direction. The flange 60 extends forward from a lower end of the side plate 58. The flange 60 is in contact with the floor surface 48*b*. The flange 60 is joined to the floor surface 48*b* (that is, the bottom portion 44*a* of the plate member 44) by for example welding.

As illustrated in FIG. 5, the reinforcing member 50 includes an extending portion 62. The extending portion 62 extends, in a plate shape, upward from an end of the top plate 52 on an inner side in the width direction. As illustrated in FIGS. 3 and 4, the extending portion 62 is held between the extending portion 42*d* of the plate member 42 and the extending portion 44*d* of the plate member 44. The extending portion 62 extends along the extending portion 42*d* and the extending portion 44*d*. The extending portion 62, the extending portion 42*d*, and the extending portion 44*d* are joined to each other by for example welding at a position where these three portions overlap.

As illustrated in FIG. 4, an end 50*a* of the reinforcing member 50 on the outer side in the width direction is opened. The end 50*a* is not in contact with the side surface 48*c*. In other words, the end 50*a* is not joined to the rear pillar 40.

At the end 50a, a step portion 64 is defined at the top plate 52, the side plate 54 and the side plate 58. The step portion 64 is continuously disposed over the top plate 52, the side plate 54 and the side plate 58. At the top plate 52, the step portion 64 shifts downward of portions other than the step portion 64. At the side plate 54, the step portion 64 shifts forward of portions other than the step portion 64. At the side plate 58, the step portion 64 shifts rearward of the portions other than the step portion 64.

Figure 7:
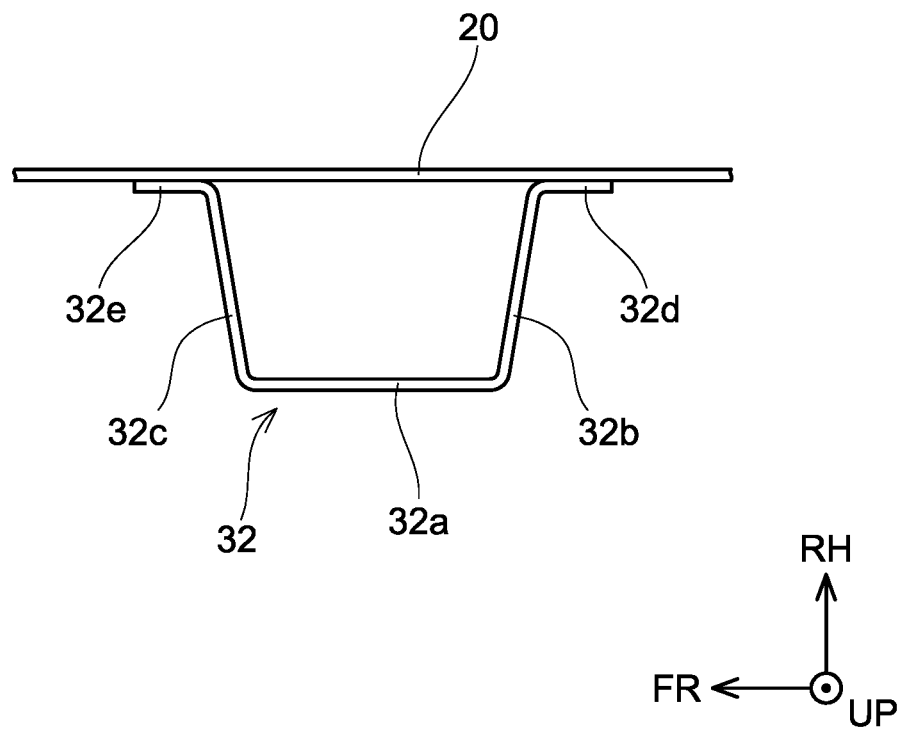
FIG. 7 illustrates a cross-sectional view along a B-B line of FIG. 6.

FIG. 7 illustrates a cross-section of the vertical member 32 along a B-B line of FIG. 6. As illustrated in FIG. 7, the vertical member 32 has a substantially U-shaped cross-sectional shape. The vertical member 32 includes a plate portion 32a extending substantially parallel to the quarter panel 20, and the plate portion 32b and the plate portion 32c respectively extending from a front end and a rear end of the plate portion 32a toward the quarter panel 20. The plate portion 32a extends along a front-rear direction and the vertical direction. The plate portion 32b and the plate portion 32c extend in the width direction and the vertical direction. In addition, the edge portion 32d and the edge portion 32e are provided at ends (portions being in contact with the quarter panel 20) of the plate portion 32b and the plate portion 32c, respectively. The edge portion 32d and the edge portion 32e are joined to the quarter panel 20 by for example welding. As illustrated in FIG. 6, respective upper ends of the plate portions 32a, 32b, 32c are connected to the rear pillar 40. As is clear from FIG. 6, the side plate 54 of the reinforcing member 50 is provided in an area extended from the plate portion 32b of the vertical member 32 toward the reinforcing member 50. In addition, as is clear from FIG. 6, the side plate 58 of the reinforcing member 50 is provided in an area extended from the plate portion 32c of the vertical member 32 toward the reinforcing member 50.

When the vehicle 10 vibrates while traveling, the rear pillar 40 vibrates. Due to the vibration of the rear pillar 40, the rear pillar 40 itself makes a sound. Contrary to this, in the vehicle 10 of the present embodiment, the vertical member 32 is connected to the rear pillar 40, and the vertical member 32 reduces the vibration of an entirety of the rear pillar 40. In addition, when the vertical member 32 reduces the vibration of the rear pillar 40, a force acts on outer walls of the rear pillar 40 (that is, the plate members 42, 44) such that the cross-section of the rear pillar 40 distorts in the vicinity of the vertical member 32, thereby the plate members 42, 44 deform. However, by virtue of the reinforcing member 50 being provided inside the rear pillar 40 at a position where the vertical member 32 is connected to the rear pillar 40, the distortion of the cross-section of the rear pillar 40 is mitigated, and deformation of the plate members 42, 44 are mitigated. As described above, by virtue of the vibration of the entirety of the rear pillar 40 being reduced and the deformation of the plate members 42, 44 which distorts the cross-section of the rear pillar 40 being mitigated, the rigidity of the rear pillar 40 is increased. In the vehicle 10 of the embodiment, in particular, the top plate 52 of the reinforcing member 50 is joined to the ceiling surface 48a, and the flanges 56, 60 of the reinforcing member 50 is joined to the floor surface 48h. According to this configuration, the rear pillar 40 can effectively be reinforced by the reinforcing member 50, thereby wobbling of the rear pillar 40 can effectively be reduced. At a portion where the plate portions 32b, 32c of the vertical member 32 (plate members extending along the width direction and the vertical direction) are connected to the rear pillar 40, a large force tends to act on the rear pillar 40 from the plate portions 32h, 32c. In the vehicle 10 of the present embodiment, the side plates 54, 58 of the reinforcing member 50 are respectively fixed in extension regions extended from the plate portions 32b, 32c of the vertical member 32, thereby the rear pillar 40 tends not to deform in the extension region. Due to this, the wobbling of the rear pillar 40 can more effectively be reduced. Further, for reasons of manufacture, a part of the reinforcing member 50 may not be joined to the rear pillar 40. In the vehicle 10 of the embodiment, the end 50a of the reinforcing member 50 on the outer side in the width direction is not joined to the rear pillar 40. In the vehicle 10, however, the top plate 52 and the side plates 54, 58 include the step portion 64 at the end 50a of the reinforcing member 50. By virtue of the step portion 64 being provided at the end 50a as such, rigidity of the reinforcing member 50 at the end 50a is increased. Due to this, even when the end 50a is not joined to the rear pillar 40, high rigidity of the reinforcing member 50 and the rear pillar 40 in the vicinity of the end 50a can be ensured. Due to this, the wobbling of the rear pillar 40 can more effectively be reduced. In addition, in the vehicle 10 of the present embodiment, the reinforcing member 50 includes the extending portion 62, and the extending portion 62 is joined to the extending portion 42d of the plate member 42 and the extending portion 44d of the plate member 44 in the state where the extending portion 62 is held therebetween. According to this configuration, the reinforcing member 50 can more firmly be fixed to the rear pillar 40, by which the rear pillar 40 can more preferably be reinforced. Due to this, the wobbling of the rear pillar 40 can more effectively be reduced. As described above, according to the vehicle 10 of the embodiment, the wobbling of the rear pillar 40 can be reduced.

Corresponding relationships between components of the embodiment and components of the claims will be described below. The side plates 54, 58 of the reinforcing member 50 of the embodiment are examples of the side plate (side plate of the reinforcing member) of the claims. The plate portions 32h, 32c of the vertical member 32 of the embodiment are examples of the plate portion (plate portion of the vertical member) of the claims. The extending portion 62 of the reinforcing member 50 of the embodiment is an example of the first plate of the claims. The plate member 42 of the embodiment is an example of the upper plate (upper plate of the pillar) of the claims. The plate member 44 of the embodiment is an example of the lower plate (lower plate of the pillar) of the claims. The extending portion 42d of the plate member 42 of the embodiment is an example of the second plate portion of the claims. The extending portion 44d of the plate member 44 of the embodiment is an example of the third plate of the claims.

In the aforementioned embodiment, explanation was made on the vehicle including the rear doors 18 (that is, a four-door, vehicle), however, the technique disclosed herein may be employed for a vehicle which does not have the rear doors 18 (that is, a two-door vehicle).

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A vehicle comprising:
a roof;
a back door;
a pillar provided next to the back door, having a tubular shape, and extending slantingly downward and backward from the roof;
a vertical member provided below the pillar, extending along a vertical direction, and connected to the pillar from below the pillar; and
a reinforcing member provided inside the pillar at a connection between the pillar and the vertical member and joined to the pillar, wherein
an inner surface of the pillar includes a ceiling surface and a floor surface, the reinforcing member comprises:
   a top plate extending along and joined to the ceiling surface;
   a side plate extending downward from at least one of a front end and a rear end of the top plate; and
   a flange extending from the side plate along the floor surface, and joined to the floor surface,
the reinforcing member comprises an end that is not joined to the pillar, the end being on an outer side of the reinforcing member in a width direction of the vehicle, and
the top plate and the side plate are stepped at the end of the reinforcing member.

2. A vehicle comprising:
a roof;
a back door;
a pillar provided next to the back door, having a tubular shape, and extending slantingly downward and backward from the roof;
a vertical member provided below the pillar, extending along a vertical direction, and connected to the pillar from below the pillar; and
a reinforcing member provided inside the pillar at a connection between the pillar and the vertical member and joined to the pillar, wherein
an inner surface of the pillar includes a ceiling surface and a floor surface,
the reinforcing member comprises:
   a top plate extending along and joined to the ceiling surface;
   a side plate extending downward from at least one of a front end and a rear end of the top plate; and
   a flange extending from the side plate along the floor surface, and joined to the floor surface,
the reinforcing member comprises a first plate portion extending upward from the top plate,
the pillar comprises an upper plate constituting the ceiling surface and a lower plate constituting the floor surface,
the upper plate comprises a second plate portion extending along the first plate portion,
the lower plate comprises a third plate portion extending along the first plate portion, and
the first plate portion, the second plate portion, and the third plate portion are joined to each other.

* * * * *